June 6, 1933.  A. M. ROSSMAN  1,912,918
ELECTRICAL TRANSMISSION SYSTEM
Original Filed Jan. 15, 1926    4 Sheets-Sheet 1

Inventor.
Allen M. Rossman.
Williams, Bradbury,
McCaleb & Hinkle Attys.

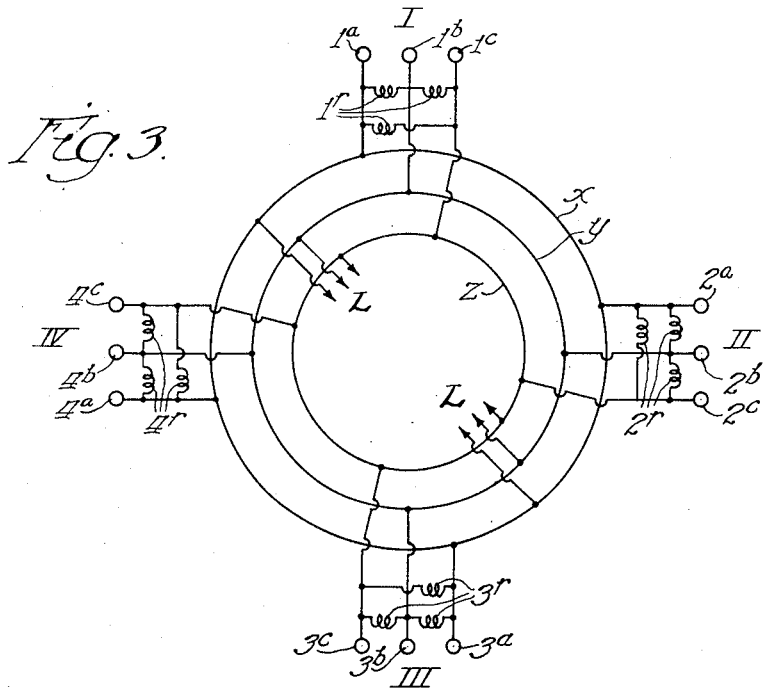
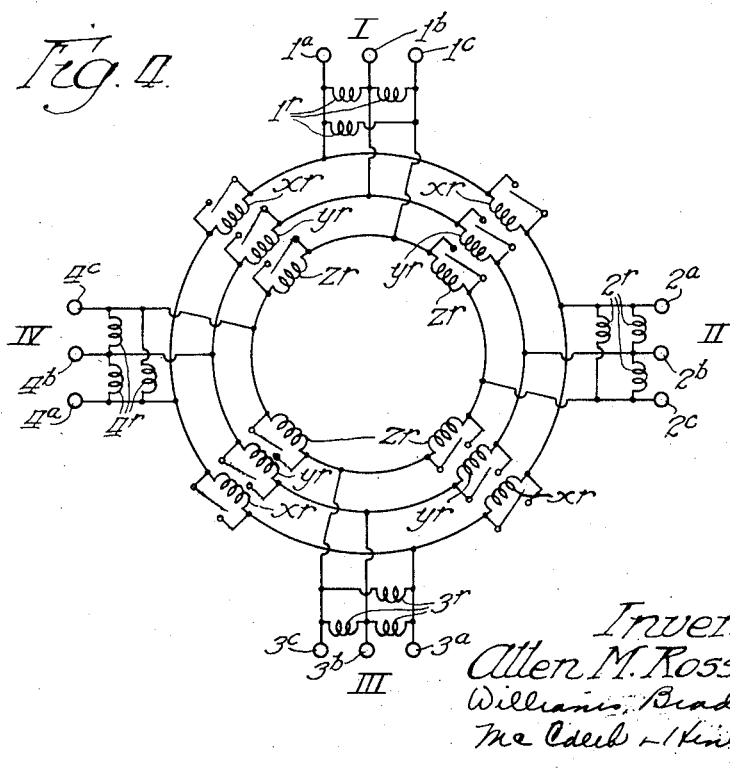

June 6, 1933.  A. M. ROSSMAN  1,912,918
ELECTRICAL TRANSMISSION SYSTEM
Original Filed Jan. 15, 1926   4 Sheets-Sheet 3

Inventor.
Allen M. Rossman.
Williams, Bradbury,
McCaleb & Hinkle
Attys.

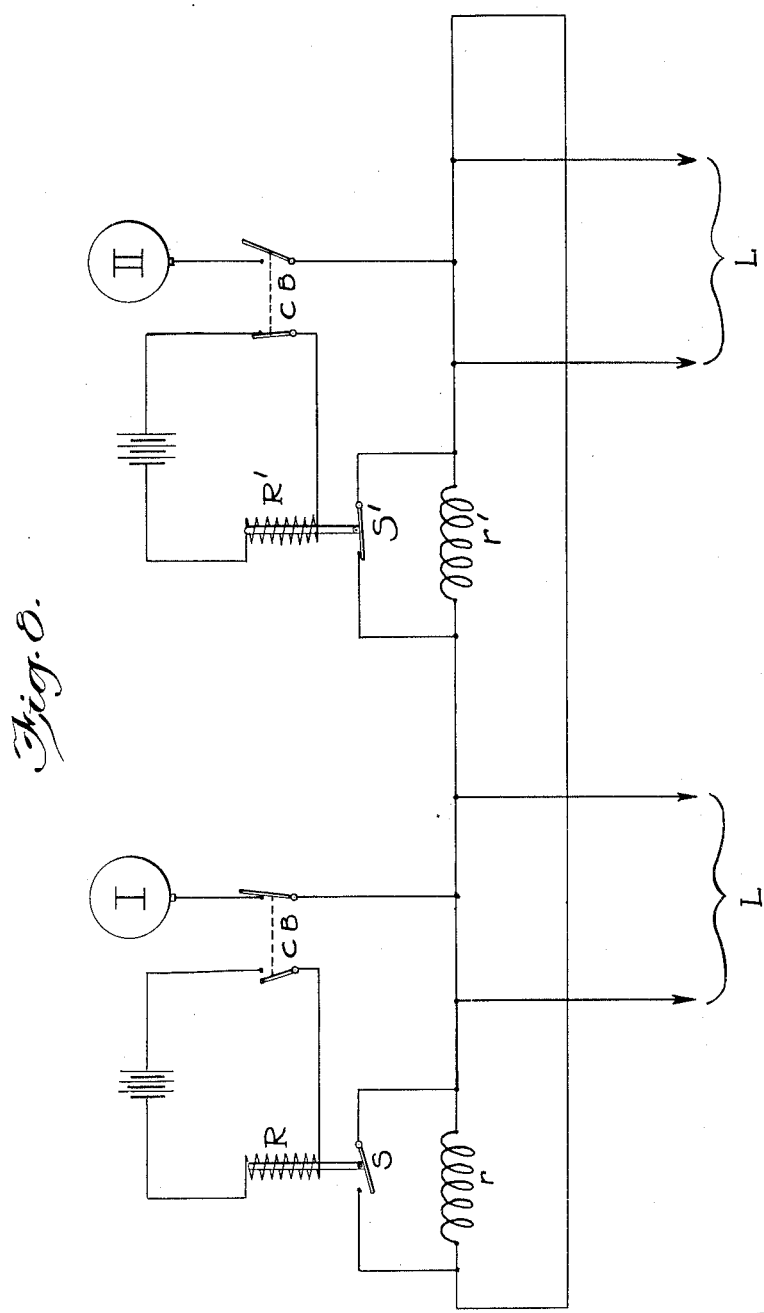

Patented June 6, 1933

1,912,918

UNITED STATES PATENT OFFICE

ALLEN M. ROSSMAN, OF CHICAGO, ILLINOIS, ASSIGNOR, BY MESNE ASSIGNMENTS, TO ROSSMAN PATENTS, INCORPORATED, OF CHICAGO, ILLINOIS, A CORPORATION OF ILLINOIS

ELECTRICAL TRANSMISSION SYSTEM

Application filed January 15, 1926, Serial No. 81,358. Renewed May 4, 1932.

My invention relates to electrical transmission systems.

It is particularly adapted for use with heavy duty alternating current systems such as are now being contemplated to meet the rapidly increasing demands for electric power.

The rapid growth of power consumption has resulted in the constant increase of the size and capacity of electric current generators and of the number of generators feeding the buses at central stations or power houses. This concentration of great current-generating capacity, which is becoming more and more pronounced and seems likely very soon to reach proportions undreamed of but a short time ago, is capable of producing disastrous effects in case of short circuits between or grounds on the buses or the feeders taking current therefrom. The greater the generating capacity connected to buses and their feeders, the greater is the current available to flow to a short circuit or ground in the event such a fault occurs.

Up to the present time the usual practice has been to insert reactance coils or reactors as they are commonly called, in the normal load circuits to initially limit the amount of current which can flow to a fault, and thus protect the system during the time interval required for the operation of circuit breakers or other protective devices which are depended upon to interrupt the circuit between the fault and the source of current supply but are inherently relatively sluggish in operation. Conditions are rapidly reaching such a state, however, that the present methods of protection will be inadequate. In other words, the mere increase in the size and number of reactors corresponding to an increase in the size and number of generators will finally permit an unbalanced condition of voltage which is undesirable, and the size of the necessary reactors and protective circuit breakers will become excessive. The difficulties incident to a mere expansion or enlargement of present methods will be made apparent by the following practical example.

It is now common practice to connect a number of generators to a single bus, which, in order that there may be an efficient distribution of load, has its ends connected together to form in effect a continuous conductor or "ring-bus", as they are ordinarily called. Protective reactors (termed bus-reactors) are inserted in this ring-bus between the points of connection of adjacent generators so that the bus is in effect divided into sections separated by reactors and the concentration of current which can flow to a fault thereby limited. Now when all of the generators are in service, the load on the bus sections is approximately equal and each generator is carrying an approximately equal portion of the entire load on the bus and there is little flow of current through the reactors between the bus sections and consequently little difference in voltage between the different bus sections. However, as is often the case, when one or more generators are shut down, this condition of balance is disturbed, and some of the reactors must carry more current to feed the sections where the generators are out of service. Thus, for example, if six generators are arranged to feed a single ring-bus and three adjacent generators happen to be shut down then, assuming an approximately equal distribution of load between the different bus sections, each of two of the reactors will carry one half of the load current of one generator and the total voltage drop along the bus will be equivalent to one half the normal current of one generator flowing across one reactor. But if the station has eighteen generators and nine adjacent generators are shut down, the maximum current carried by any reactor is two times the normal current of one generator and the voltage drop is five times the normal current of one generator flowing across one reactor. Thus although the generator capacity in the second instance is only three times that of the first, the reactor current rating required has been increased four times and the voltage drop is ten times greater. Thus the size of the reactors required and the voltage drop increase more rapidly than the increase in the generator capacity. The latter condition, which is probably the more important, leads to an unbalanced condition of voltage around the bus which may become a serious obstacle to proper operation. Of course the first condition necessitates relatively larger and more expensive reactors.

One of the objects of my invention is to provide an improved electrical transmission system.

Another object is to provide a system wherein, in the event of a short circuit or ground, adequate protection will be afforded until the circuit breaker or other primary means of protection has had time to function.

Another object is to provide adequate protection without objectionable detriment to normal operation and without excessive expense.

Another object is to provide an improved arrangement of reactors so as to insure protection at relatively small expense and power loss.

Another object is to provide an arrangement of reactors whereby, under normal operating conditions, relatively little current will flow through them, but, in the event of a short circuit or ground adequate and dependable protection will be afforded.

Another object is to provide an arrangement of reactors whereby under normal operating conditions an excessive drop in voltage and the serious unbalance resulting therefrom is prevented.

Another object is to provide a multi-bus system wherein interchange of power is possible between generators connected to different buses.

Other objects and advantages will hereinafter appear.

Embodiments of my invention are diagrammatically illustrated in the accompanying drawings wherein I have shown my improved reactor arrangement applied to a single phase of an alternating current system of electric transmission. It is to be understood, however, that for multi-phase systems the same arrangement would be followed for each phase.

In the drawings:

Fig. 3 shows a system employing four sets of three generators each and three ring-buses.

Fig. 4 shows a system, which ordinarily will be better than that shown in Fig. 3, for a three-generator set system of the same size.

Fig. 8 is a diagram of a conventional bus reactor short circuiting arrangement whereby the reactors may be controlled by the adjacent generators.

Figure 1:
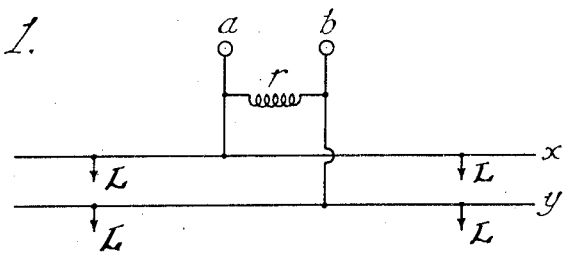
Fig. 1 shows a very simple system employing but two generators and two straight buses.

In Fig. 1 two generators $a$ and $b$ are each connected directly or non-inductively to a corresponding straight bus $x$ and $y$ respectively. Load feeders L taken from the buses are indicated by the small arrows leading therefrom. An equalizing reactor $r$ interconnects the generators at a point ahead of their connections to their respective bus. With this arrangement each generator feeds current to its own bus without the interposition of a reactor. However, at all times, each generator is in a position to feed current to the other bus if the load on that other bus becomes greater than the output of its generator or if for any other reason an interchange of power is desired. But notwithstanding this permissible exchange of power, if a ground occurs on either bus or any of its feeders the current from only the directly or non-inductively connected generator can flow unchecked to the fault. The tendency for a sudden rush of current to flow from the other generator to the fault will be checked by the inductive choking action of the interposed reactor so that the primary means of protection, such as automatic current controlled circuit breakers, will have time to operate and open the circuit before the current becomes unduly excessive. The circuit breakers are not shown because their construction and use are well known and they are here employed in the usual way.

The equalizing reactor performs an additional important function in that it serves to keep the two generators in synchronism. If one generator tends to lag behind the other it can take some current from the other and, by its motor action, will be maintained at the proper speed.

Ordinarily the exchange of power need not be great and, since the maximum load any reactor will have to carry even in the event of a short circuit will be less than the output of one generator, the size of the reactors may be kept within practicable limits.

Figure 2:
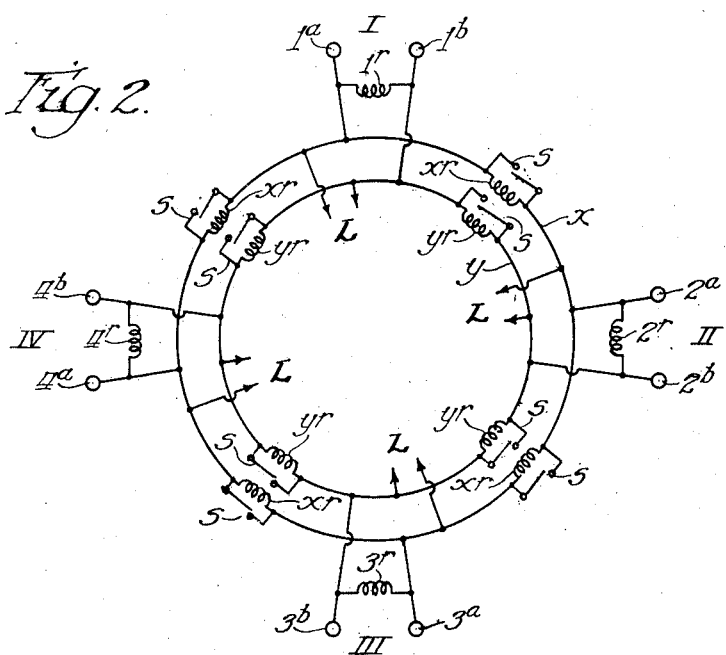
Fig. 2 shows a more elaborate system employing four sets of generators, each set comprising two generators, and two ring-buses.

Fig. 2 shows eight generators arranged in four groups I, II, III and IV of two generators each. Generators $1a$, $2a$, $3a$ and $4a$ are directly or non-inductively connected to a ring-bus $x$ and generators $1b$, $2b$, $3b$ and $4b$ are similarly connected to a ring-bus $y$. Again in this diagram, as in those hereinafter described, load feeders L are indicated by arrows connected to the busses. Between each set or group of generators a bus reactor $xr$ or $yr$ is interposed in the corresponding ring bus dividing each bus into as many sections as there are groups or sets of generators. Bus reactors so placed have been used for some years. Usually each bus reactor is provided with a short circuiting shunt s controlled by a circuit breaker. These circuit breakers are controlled by an adjacent generator so that when the generator is operating the shunt is open and the corresponding bus reactor is in service. When, however, a generator is shut down the associated circuit breaker closes the shunt around the corresponding reactor and the reactor is short circuited. Fig. 8, hereinafter described, illustrates a typical arrangement for accomplishing this result.

An equalizing reactor 1r, 2r, 3r and 4r respectively is connected between the two generators of each set ahead of the point where each generator is connected to its bus. With this arrangement an interchange of power is permissible between both generators of the sets to both buses but in the event of a fault only one generator can feed current unchecked thereto. Consequently, although there may be an interchange of power to take care of unequal loading of the two buses yet the concentration of power that can flow to a fault is limited. Likewise the voltage drop along the buses under normal operating conditions may be kept within limits which will not interfere with proper performance. The reactors also exert the synchronizing action between the generators, as previously explained.

Fig. 3 shows an installation comprising four groups or sets of generators of three generators each. Generators 1a, 2a, 3a, and 4a are directly connected to a ring-bus x, likewise generators 1b, 2b, 3b, and 4b are directly connected to a ring-bus y and generators 1c, 2c, 3c and 4c are directly connected to a ring-bus z. The generators of each set or group are interconnected in delta through three equalizing reactors 1r, 2r, 3r and 4r respectively. The load feeders L are connected to the buses in the usual way. The arrangement shown in this figure permits the generators of each group to feed current directly to one of the buses and to feed to either or both of the other buses through an equalizing reactor. Thus there may be interchange of power from any of the generators to all of the buses but the concentration of power which can rush to a fault is limited by the reactors. The synchronizing action of the reactors is also present. The system shown in this figure is not provided with bus reactors.

Fig. 4 shows a system similar to that shown in Fig. 3 except that bus reactors xr, yr, and zr are interposed between the corresponding generators of adjacent sets.

Figure 5:
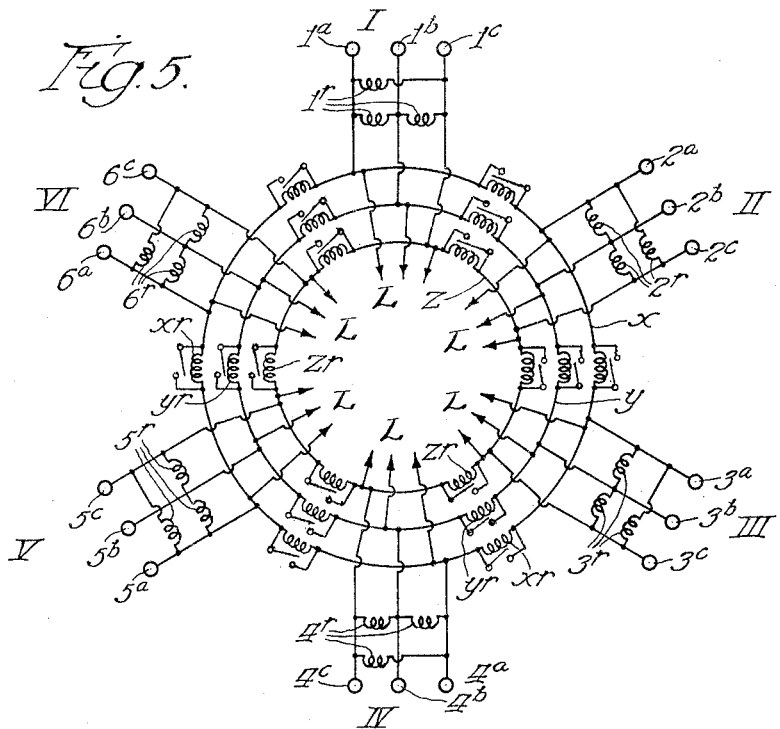
Fig. 5 shows a preferred arrangement for an installation of six three-generator sets.

Fig. 5 illustrates the lay-out for an eighteen generator installation. The generators are divided into six groups of three generators each connected to three ring-buses x, y and z. Thus generators, 1a, 2a, 3a, 4a, 5a and 6a are connected directly to ring-bus x; generators 1b, 2b, 3b, 4b, 5b and 6b are connected directly to ring-bus y; and generators 1c, 2c, 3c, 4c, 5c and 6c are connected directly to ring-bus z. Bus-reactors xr, yr and zr with shunts and circuit breakers (not shown) such as heretofore mentioned are interposed in the corresponding ring buses between adjacent generators connected thereto. Equalizing reactors 1r, 2r, 3r, 4r, 5r and 6r, three for each set or group of generators are connected in delta between the three generators constituting each set. The interchange of power, sychronizing effect and the protection heretofore mentioned are provided and yet the voltage drop and current flowing through reactors is not excessive under any normal operating condition. Thus, taking the same conditions as were assumed in the explanatory example given at the beginning (i. e. nine adjacent generators out of service and the load on the buses approximately equally distributed over each of their six sections) no reactor will be carrying more than one-half of the full load current of one generator and consequently the total voltage drop along a bus is equivalent to one-half of the normal current of one generator flowing across one reactor. In other words assuming an extreme if not the worst normal operating condition, the unbalanced condition, caused by voltage drop along the buses and the reactor current rating for an eighteen generator installation employing my invention is substantially the same as for a six generator installation employing bus reactors only.

The capability of interchanging power between generators and the buses in my system affords an important advantage in that no reserve buses are required as is the case with prior systems. In case of a disability of any one bus section, the corresponding section of one of the other two buses will serve as a reserve. Therefore, for example, instead of requiring six buses in a three-generator set, as the prior practices would ordinarily require, my system provides an equal degree of flexibility with only three buses.

Figure 6:
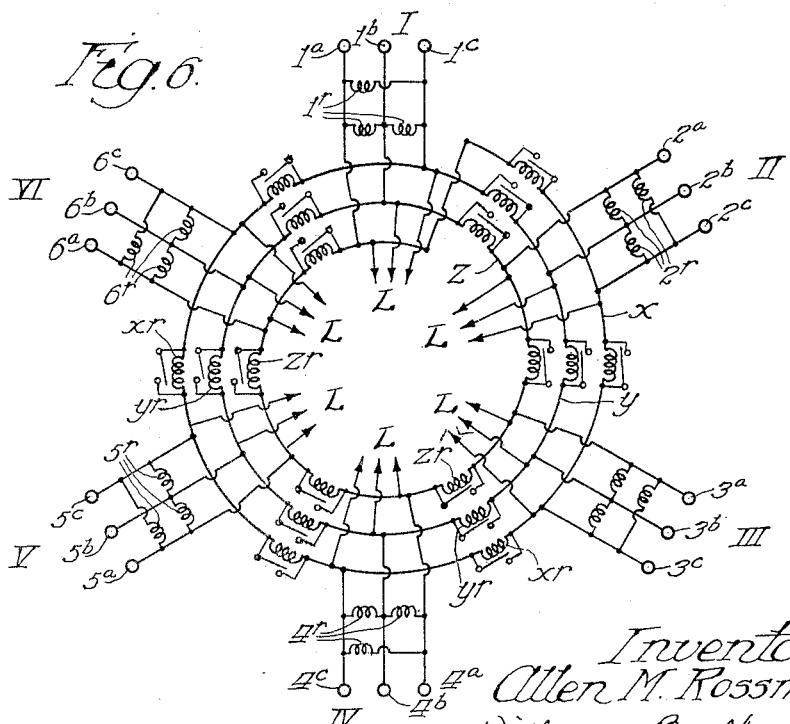
Fig. 6 shows a modified arrangement for an installation of the same size using a continuous ring bus.

Instead of employing a separate bus for all of the corresponding generators of the various sets or groups (i. e. for example, providing as many separate ring buses as there are generators in each set or group) all of the generators may be connected to a single or, in effect continuous bus. When such an arrangement is used, however, it may be desirable ordinarily, in order to equalize the delivery of current to the bus and thereby minimize the voltage drop around the same, to connect the generators of each group at equidistant points about the bus. For example, if each generator group contains three generators they would be connected approximately 120° apart on the single ring bus as illustrated in Fig. 6. Thus if only one set of generators is running the distribution of power still will be quite equally divided over the entire bus.

The same delta arrangement of equalizing reactors between the generators of each set is here employed. These equalizing reactors assist in maintaining the generators in synchronism and in the interchange of power from any generator to adjacent bus sections, the sections being provided by the insertion of bus reactors in the bus between the points where adjacent generators are connected.

Figure 7:
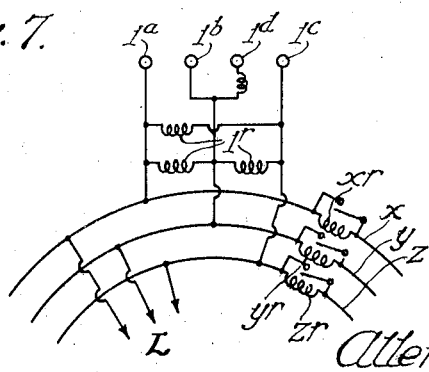
Fig. 7 shows a method of connecting reactors in a four-generator set three ring bus installation.

Fig. 7 shows an arrangement of connections which may be employed to connect four-generator sets to a three-ring bus. The four generators 1a, 1b, 1c, and 1d of only one set are shown connected to the three ring-buses x, y and z. Bus reactors xr, yr and zr are interposed in the bus bars between the adjacent generators connected to the respective bus bars x, y, and z. The three equalizing reactors 1r are connected in delta between the generators as before. In addition a fourth equalizing reactor may be connected in the load circuit of generator 1d although it may not always be necessary to use this reactor.

Fig. 8 illustrates diagrammatically a typical arrangement whereby the bus reactors may be connected in circuit or short circuited, depending upon whether or not adjacent generators are in service. Thus the circuit breaker CB, which is open to the bus when generator I is shut down and closed when the generator is in service, controls a circuit to a relay R. When the generator is in service and consequently circuit breaker CB is closed to the bus the back contact of the circuit breaker is open and the circuit to relay R is open and the bus reactor short circuiting switch S is open. Then the reactor r' is in service, as shown at the left of the diagram. At the right of the diagram generator II is shown as shut down with its circuit breaker CB open to the bus. In this condition the back contact of its circuit breaker holds closed the circuit to its associated relay R' and the short circuiting switch s' is closed and bus reactor r' is short circuited and out of service.

Having thus illustrated and described the nature and several embodiments of my invention, what I claim and desire to secure by United States Letters Patent is as follows:

1. An electrical transmission system comprising a plurality of busses, reactors connected between said busses to form a plurality of ring circuits, generators connected to each of said busses, reactors connected between each bus of one of the ring circuits and the corresponding busses of the other ring circuits, and load circuits connected to said busses.

2. An electrical transmission system having a plurality of generators, a plurality of busses one connected to each of said generators, reactors connected between busses to form a plurality of ring circuits, reactors connected between a bus of one of said ring circuits and corresponding busses of the other ring circuits, and load circuits connected to said busses.

3. An electrical transmission system comprising a plurality of busses each having load circuit connections, a generator for each bus, reactors connected between said busses to form a plurality of ring circuits, and other reactors connected between each bus of one ring circuit and corresponding busses of other of said ring circuits.

4. An electrical transmission system comprising a plurality of busses, reactors connected between said busses to form a plurality of circuit turns which constitute at least one ring circuit, generators connected to each of said busses, reactors connected between each bus of one of the circuit turns and the corresponding busses of the other circuit turns, and load circuits connected to said busses.

5. An electrical transmission system having a plurality of generators, a plurality of busses, one connected to each of said generators, reactors connected between said busses to form a plurality of circuit turns which constitute at least one ring circuit, reactors connected between a bus of one of said circuit turns and the corresponding busses of the other circuit turns, and load circuits connected to said busses.

6. An electrical transmission system comprising a plurality of busses, each having load circuit connections, a generator for each bus, reactors connected between said busses to form a plurality of circuit turns which constitute at least one ring circuit, and other reactors connected between each bus of one circuit turn and corresponding busses of other of said circuit turns.

7. An electrical transmission system comprising a plurality of bus sections, each having a load circuit connection, a generator for each bus section, bus reactors connected between bus sections to form at least one ring circuit, and an equalizing reactor shunting at least one bus section.

8. An electrical transmission system comprising a plurality of bus sections, each having a load circuit connection, a generator for each bus section, bus reactors connected between bus sections to form at least one ring circuit, and an equalizing reactor shunting at least two bus reactors.

9. An electrical transmission system comprising a plurality of bus sections, each having a load circuit connection, a generator connected to each bus section, bus reactors connected between bus sections to form at least one ring circuit, and equalizing reactors each connecting two bus sections which are separated by at least two bus reactors.

10. An electrical transmission system comprising a plurality of generators, a plurality of busses one connected to each of said generators, bus reactors connected between busses to form a plurality of ring circuits, an equalizing reactor connected between a bus of one of said ring circuits and a bus of another ring circuit, and load circuit connections for said busses.

11. An electrical transmission system comprising a plurality of bus sections, reactors connected between bus sections to form a plurality of ring circuits, a plurality of sets of generators, each set consisting of generators connected between bus reactors defining corresponding bus sections of the ring circuits, equalizing reactors connected between corresponding bus sections of the ring circuits, and a load circuit connection for each bus section.

In witness whereof, I hereunto subscribe my name this 4th day of January, 1926.

ALLEN M. ROSSMAN.